May 13, 1930. J. E. ROBISON 1,758,902
GROUND GRIPPING CHAIN FOR AUTOMOBILE TIRES
Filed Oct. 26, 1926
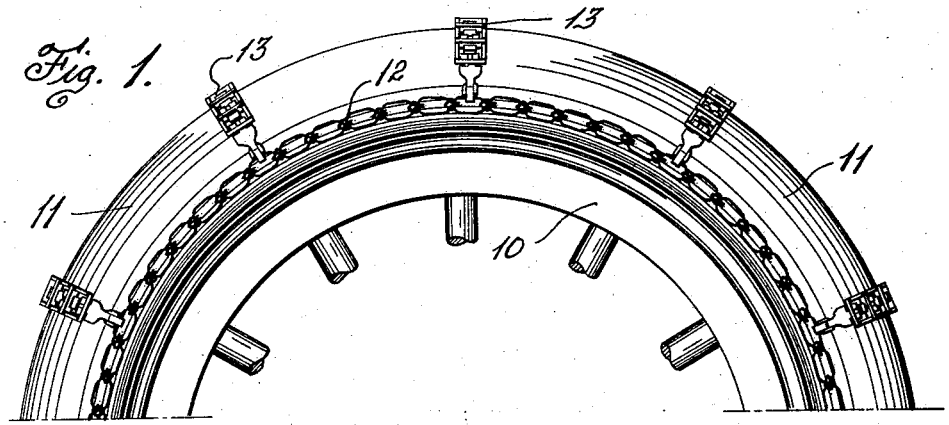
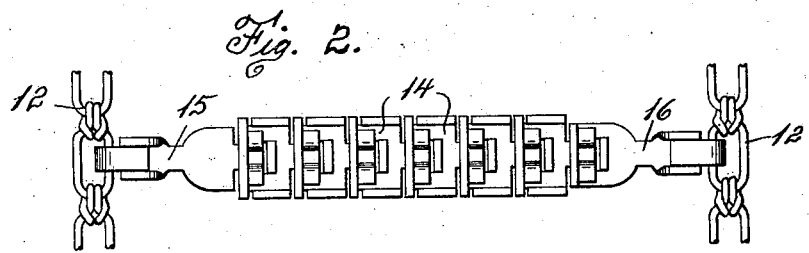
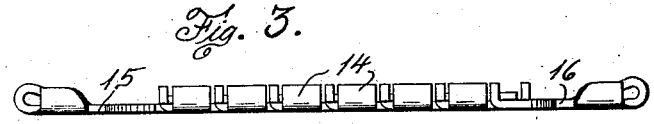
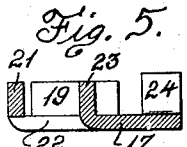 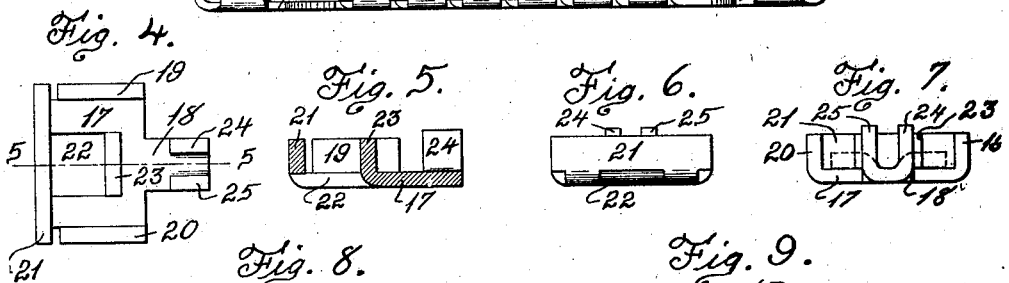  
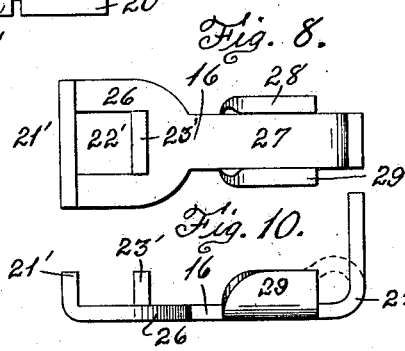
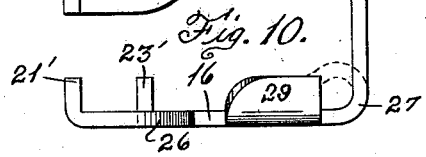
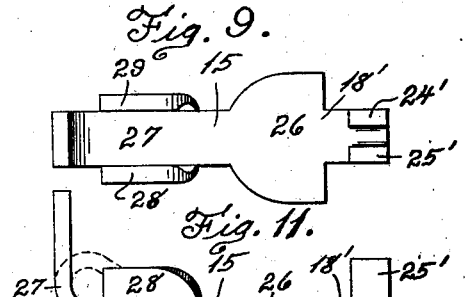
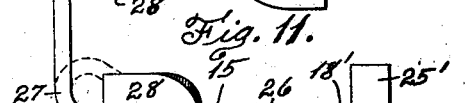
Inventor:
James E. Robison.
By Silas C. Sweet.
Attorney.

Patented May 13, 1930

1,758,902

UNITED STATES PATENT OFFICE

JAMES E. ROBISON, OF BOULDER, COLORADO, ASSIGNOR OF ONE-EIGHTH TO RALPH M. REEVES, OF DENVER, COLORADO

GROUND-GRIPPING CHAIN FOR AUTOMOBILE TIRES

Application filed October 26, 1926. Serial No. 144,219.

An object of this invention is to provide an improved construction for ground-gripping chains for automobile tires adapted to insure traction and minimize slipping and skidding on wet, soft, slippery and unstable surfaces.

A further object of the invention is to provide an improved construction of cross-chain or tractive element in ground-gripping chains for automobile tires.

A further object of the invention is to provide a cross-chain or tractive element for ground-gripping chains for automobile tires formed of inter-connected links having surface-engaging means on one side and a smooth surface on the side opposite said means.

A further object of the invention is to provide an improved construction of link adapted to be inter-connected to form a non-kinking, self-cleaning, surface-engaging cross-chain having a smooth surface against the tire tread, for ground-gripping chains for automobile tires.

A further object of the invention is to provide improved means for connecting the cross-chains to the side chains of ground-gripping devices for automobile tires.

A further object of the invention is to provide an improved construction for ground-gripping chains for automobile tires wherein the tractive elements retain gripping efficiency throughout long use, are not easily damaged nor broken and may be readily removed and replaced.

My invention consists in the construction, combination and arrangement of elements hereinafter set forth, pointed out in my claims and illustrated by the accompanying drawing, in which—

Figure 1 is a side elevation of a portion of an automobile wheel and tire equipped with my improved ground-gripping chain. Figure 2 is a plan of one of the cross-chains of my improved device connecting fragments of side chains. Figure 3 is a side elevation of the cross-chain shown in Figure 2, the side chains being omitted. Figure 4 is a detail plan view of one of the tractive links comprising the cross-chain. Figure 5 is a longitudinal section on the indicated line 5—5 of Figure 4. Figure 6 is one end elevation and Figure 7 the opposite end elevation of the link shown in Figure 4, dotted lines in Figure 7 showing the position of the locking lugs when the links are inter-connected. Figure 8 is a plan and Figure 10 a side elevation of one of the hooks employed to connect the cross-chain to the side chains and Figure 9 is a plan and Figure 11 a side elevation of the other of said hooks.

In the construction of my improved chain as shown, the numeral 10 designates, generally, an automobile wheel equipped with a pneumatic tire 11. Parallel side chains 12 are spaced apart and connected at spaced intervals by cross-chains 13 in a common and well known manner. The side chains 12 may be of any flexible link construction, a common form being shown in Figures 1 and 2, and are of a length less than the tread circumference of the tire on which the chain is to be mounted, one end of each of the side chains 12 being provided with a hook member (not shown) adapted to engage in the free end of said chain, thus forming each of the side chains into an approximate circle of a diameter less than that of the tire, all of which is common and well known. Any form or type of hook may be employed to connect the side chains, there being a wide variety of such hooks adapted for this specific use. The cross or connecting chains 13 comprise the tractive elements of the device and are spaced between the side chains at suitable intervals, the number of such cross-chains varying with the size of the tire on which the complete chain is to be mounted. The cross-chains 13 are of link construction adapted to conform to the cross-sectional curvature of the tire and are of varying lengths in different chain assemblies, the length or number of links varying according to the size of the tire for which the chain is adapted. The cross-chain construction comprises a plurality of inter-connected similar links or units 14, a hook member 15 and a hook member 16. The links 14 are inter-connected in number sufficient to form the length of tractive element desired and each such link assembly is provided with a hook member 15 at one end and a hook member 16 at its other end whereby attachment to the side chains is had. The links 14 and hook members 15 and 16 are preferably formed of sheet or strip metal by pressing or stamping and are of forms hereinafter more particularly described. The links 14 are substantially rectangular in plan, of greater width than length, and formed with a tongue portion projecting longitudinally from the median portion of one end. The base portion 17 of each link 14 is substantially plane and merges into the tongue 18 which projects as above described. Parallel, surface-engaging ears or lugs 19, 20 are formed on and project upwardly at substantially right angles from the plate 17 on either side thereof and a similar ear or lug 21 is formed on and projects upwardly from said plate along the side or end opposite to the tongue 18, the lug 21 being of a length sufficient to overlap the ends of the lugs 19 and 20 and having its ends in the same planes as the outer faces of said latter lugs. The upper margins or edges of the lugs 19, 20 and 21 lie in the same plane and the lug 21 is at right angles to the lugs 19 and 20, the metal in the corners of the plate 17 between the ends of the lugs being removed to prevent distortion during the process of forming. A rectangular aperture 22 is formed in the plate 17 equidistant from the lugs 19 and 20 and adjacent the lug 21 and extends outwardly through the lug 21 to form a downwardly opening central notch in the lower portion of said lug, the upper margin of said notch being in the same plane as the upper surface of the plate 17. A portion of the metal cut to form the aperture 22 is not severed from the plate 17 but is bent at right angles to said plate and forms a lug 23 parallel to and spaced from the lug 21, said lug 23 likewise having its upper margin in the same plane as the margins of the lugs 19, 20 and 21. The extremity of the tongue 18 is formed with spaced, parallel, upwardly extending, integral ears 24, 25, said ears being parallel to the lugs 19 and 20, spaced from the plate 17 and having their upper margins in a plane above that of the lugs 19, 20 and 21. As may be readily seen in Figure 2 of the drawing, the ears 24 and 25 are adapted to be received through the aperture 22 of an adjacent link and be spread outwardly and downwardly to the position shown in dotted lines in Figure 7, thereby locking adjacent links one to another. The width of the ears 24 and 25 being very nearly equal to the space between the lugs 21 and 23, very little movement between the links tending to disaline the lugs 19 or 20 of adjacent links is possible, thus preventing kinking of the cross-chain assemblies when the chain is dismounted or packed. The notch in the lower portion of the lug 21 overlies the tongue 18 and provides an articulation permitting angular displacement between the planes of the plates 17 of adjacent links whereby the links may be made to conform to the contour of a tire, engagement of the spread portions of the ears 24 and 25 with the upper face of the plate 17 limiting such angular displacement in one direction. The hook members 15 and 16 are, in general, similar and different only in the means carried by said members for their attachment to the links 14. Each of said hook members comprises a plate or body portion 26 and a tongue portion 27 extending therefrom. The tongue portions 27 are relatively long and narrow and have each a portion of the extremity bent upwardly at substantially right angles to the plane of the major portion. Similar, spaced, parallel ears 28, 29 are formed on either side of and extend upwardly from the tongue portions 27. The upwardly extending extremities of the tongue portions 27 are adapted to engage in loops in the side chains 12 and be bent back against the major portions of said tongues to form loops embracing side bars of the links comprising the side chains, as clearly shown in Figures 1, 2 and 3 and in dotted lines in Figures 10 and 11 of the drawing. The free end of the tongue portion 27, when bent to form the loop as above described, is adapted to be received between and protected against displacement by the ears 28 and 29, the shoulders formed by said ears adjacent the loops preventing the side chain links from becoming wedged or pinched in the narrower portion of said loops. The plate portion 26 of the hook member 15 is formed with a tongue 18' and ears 24' and 25' in all respects similar to the tongue 18 and ears 24 and 25 of one of the links 14, whereby said hook member may be connected to a link 14 in the same manner as adjacent links are interconnected, and the hook member 16 has its plate 26 formed with lugs 21' and 23' and an aperture 22' similar to the lugs 21 and 23 and the aperture 22 of a link 14, whereby said hook member may be connected to a link 14 opposite to the hook member 15.

In the practical use of my improved device, links 14 and hook members 15 and 16 are interconnected to form a tractive element of the desired length and cross-chains so formed are connected by means of the tongue portions 27 to the side chains to form the chain assembly which is to be mounted on the tire. When mounted, as shown in Figure 1, the smooth under surfaces of the links 14 and hook members 15 and 16 lie against the surface or tread of the tire and because of their freedom from edges and angles preclude any injury thereto. The lugs 19, 20, 21 and 23 grip the surface engaged by the tire in rotating and prevent slipping or skidding. The motion between the links as the tire rotates squeezes out any mud or foreign matter which might tend to clog the links and render the grip of the lugs ineffective, thus keeping the tractive element operative at all times. The flexibility of the construction permits of close packing of the chain when not in use and the use of stamped metal, formed as described, provides a tractive element which will not soon wear smooth nor readily break and which is simple of manufacture and inexpensive.

I claim as my invention:—

1. In a ground-gripping chain for automobile tires having spaced, parallel side chains, cross-chains between and connecting said side chains, said cross-chains comprising a tractive element formed of a plurality of similar, flat, separably interconnected links having each one smooth surface and angularly disposed surface-engaging means on the other surface, said means comprising marginal lugs on said link at substantially right angles to said surface and to one another and a central lug parallel to one of said marginal lugs, said links being hingedly interconnected for limited articulation, and hook members hingedly secured to either end of said tractive element.

2. In a ground-gripping chain for automobile tires, a cross-chain comprising a plurality of similar, flat, separably interconnected links substantially rectangular in form having each one smooth surface, marginal lugs on three sides of the other surface, a fluked tongue projecting from the fourth side, an aperture adjacent the lug opposite said tongue, a central lug adjacent said aperture, and hook members hingedly secured to said links at either end of said cross-chain.

3. In a ground-gripping chain for automobile tires, means for hingedly inter-connecting the cross-chain links thereof to prevent kinking and twisting, said means comprising a transverse lug on one end of and at right angles to one of said links, an aperture centrally of said link adjacent to and intersecting said lug, a central lug on said link parallel to and spaced from said first named lug adjacent said aperture, a tongue projecting from the adjacent end of the link to be connected, spaced, parallel, marginal ears on the extremity of said tongue, said ears being adapted to be received through said aperture and be bent outwardly and downwardly against said first named link between the lugs thereof.

Signed at Denver, in the county of Denver and State of Colorado, this 22nd day of October, 1926.

JAMES E. ROBISON.